United States Patent
Jia

(10) Patent No.: US 8,274,987 B2
(45) Date of Patent: Sep. 25, 2012

(54) CONTENTION FREE PIPELINED BROADCASTING WITHIN A CONSTANT BISECTION BANDWIDTH NETWORK TOPOLOGY

(75) Inventor: Bin Jia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/728,747

(22) Filed: Mar. 22, 2010

(65) Prior Publication Data

US 2011/0228789 A1  Sep. 22, 2011

(51) Int. Cl.
H04L 12/28 (2006.01)
(52) U.S. Cl. ......... 370/401; 370/386; 370/394; 370/400
(58) Field of Classification Search .......... 370/386–394, 370/400–401
See application file for complete search history.

(56) References Cited

U.S. PATENT DOCUMENTS

| | | | |
|---|---|---|---|
| 4,598,400 A | | 7/1986 | Hillis |
| 4,742,511 A | | 5/1988 | Johnson |
| 5,265,207 A | * | 11/1993 | Zak et al. ........................ 712/15 |
| 5,553,078 A | | 9/1996 | Horie |
| 6,424,659 B2 | * | 7/2002 | Viswanadham et al. ...... 370/469 |
| 7,079,525 B1 | * | 7/2006 | Goldstein et al. ............. 370/352 |
| 7,193,994 B1 | * | 3/2007 | Payson ........................... 370/380 |
| 7,194,661 B1 | * | 3/2007 | Payson ............................. 714/43 |
| 7,221,650 B1 | * | 5/2007 | Cooper et al. ................. 370/236 |
| 7,257,758 B1 | * | 8/2007 | Manula et al. ................. 714/752 |
| 7,860,096 B2 | * | 12/2010 | Johnsen et al. ............... 370/392 |
| 8,095,721 B2 | * | 1/2012 | Kimura et al. ................ 710/317 |
| 2002/0150056 A1 | | 10/2002 | Abadi et al. |
| 2003/0093567 A1 | * | 5/2003 | Lolayekar et al. ............ 709/246 |
| 2005/0050361 A1 | | 3/2005 | Miyanaga |
| 2007/0140244 A1 | | 6/2007 | Jia |
| 2009/0003344 A1 | | 1/2009 | Kumar |
| 2009/0006808 A1 | | 1/2009 | Blumrich et al. |
| 2009/0006810 A1 | | 1/2009 | Almasi et al. |
| 2009/0016332 A1 | | 1/2009 | Aoki et al. |
| 2009/0049114 A1 | | 2/2009 | Faraj |
| 2009/0063880 A1 | | 3/2009 | Arimilli et al. |
| 2009/0064140 A1 | | 3/2009 | Arimilli et al. |

OTHER PUBLICATIONS

Sheu, et al, An optimal broadcasting algorithm without message redundancy in star graphs, IEEE Transactions on Parallel and Distributed Systems, vol. 6, No. 6, pp. 653-658, Jun. 1995.
Patarasuk, et al., Techniques for pipelined broadcast on ethernet switched clusters, Journal of Parallel and Distributed Computing, 2008 68/6 (809-824), May 15, 2008.

(Continued)

*Primary Examiner* — Ayaz Sheikh
*Assistant Examiner* — Andrew C Lee
(74) *Attorney, Agent, or Firm* — Matthew W. Baca; Amy J. Pattillo

(57) ABSTRACT

In an interconnection network, multiple nodes are connected to one of a first layer of switches. The first layer of switches is connected to one another through a second layer of switches. Each of the nodes is connected through one of multiple shared links connecting the first layer switches and the second layer of switches. A pipelined broadcast manager schedules a hierarchical pipelined broadcast through at least one switch of the first layer switches comprising non-root nodes by selecting two nodes among the non-root nodes connected to the at least one switch and scheduling each of multiple broadcast steps for the pipelined broadcast with at least one of an inter-switch broadcast phase and an intra-switch broadcast phase using the selected two nodes.

17 Claims, 5 Drawing Sheets

OTHER PUBLICATIONS

Liu et al, MPI over Infiniband:Early Experiences, Network-Based Computing Laboratory Computer and Information Science, Aug. 18, 2003, 16 pages.

Mamidala et al, Efficient SMP-Aware MPI-Level Broadcast over InfiniBand's Hardware Multicast, Department of Computer Science and Engineering, Parallel and Distributed Processing Symposium, 2006, 8 pages.

Hewlett Packard, Using InfiniBand for a scalable compute infrastructure,Technology Brief, 3rd Edition, 15 pages, Apr. 2009.

Aoyama et al, RS/6000SP: Practical MPI Programming, International Technical Support Organization, International Business Machines Corporation, Aug. 1999, 238 pages.

"Optimal Multiple Message Broadcasting in Telephone-Like Communication Systems", A. Bar-Noy et al., pp. 1-17, Oct. 9, 1966.

"Building a High-Performance Collective Communication Library", M. Barnett et al., pp. 107-116, Nov. 14-18, 1994.

"Optimal Broadcasting and Personalized Communication in Hypercubes", S. Lennart Johnsson et al, IEEE Transactions on Computers, vol. 38, No. 9, Sep. 1989.

Office Action, U.S. Appl. No. 11/314,418, filed Dec. 21, 2005, Bin Jia, mailing date Sep. 18, 2008, 7 pages.

Final Office Action, U.S. Appl. No. 11/314,418, filed Dec. 21, 2005, Bin Jia, mailing date Mar. 5, 2009, 8 pages.

* cited by examiner

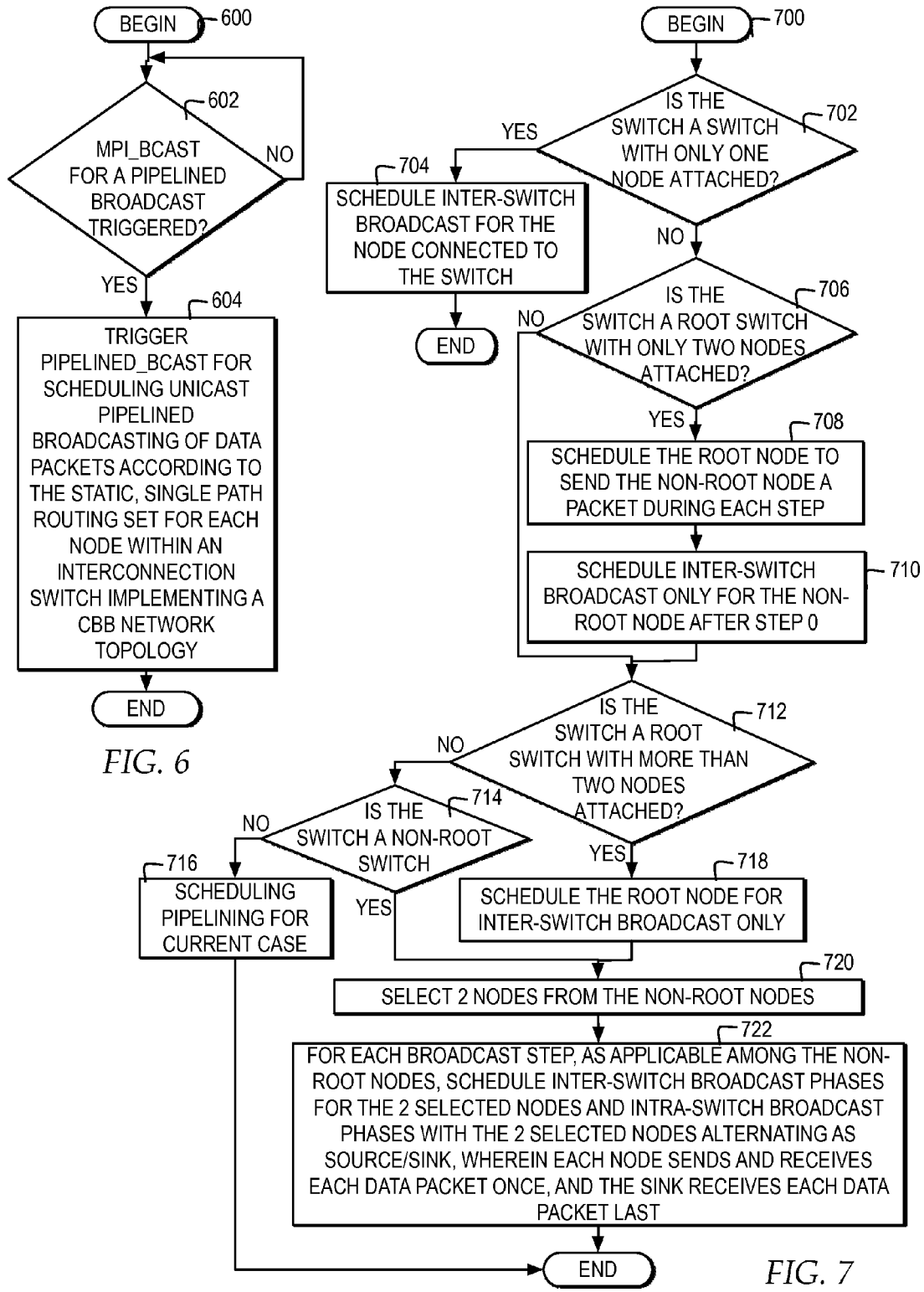

CONTENTION FREE PIPELINED BROADCASTING WITHIN A CONSTANT BISECTION BANDWIDTH NETWORK TOPOLOGY

BACKGROUND

1. Technical Field

The present application relates generally to an improved data processing system and method and more specifically the present application is directed to providing efficient, contention free, pipelined broadcasting within an interconnection network implementing a constant bisection bandwidth (CBB) network topology.

2. Description of Related Art

To improve network performance, high performance parallel computing environments have been developed which often include one or more cluster systems, with each cluster system connecting many nodes by one or more interconnection networks. Nodes may include one or more processors, one or more I/O devices, memory, and other components. As cluster systems continue to add additional nodes and other components, the communication latency and bandwidth requirements for communications within the cluster also increases.

To manage and reduce communication latency and bandwidth requirements within a parallel computing environment, one or more switches may be implemented to connect the nodes in an interconnection network. For example, a parallel computing environment may implement a crossbar switch to connect multiple nodes, where the crossbar switch provides full bandwidth and uniform latency between any pair of nodes the crossbar switch connects.

In one example of an interconnection network implements a fully-connected network topology with one or more crossbar switches sufficient to provide a dedicated link between any pair of nodes, such that for "N" number of nodes, a crossbar switch with N×N ports is needed. In implementing a fully-connected network topology, as the number of nodes increases, the number of ports required also increases, and a crossbar switch of N×N ports may become impractical.

Within an interconnection network, one option for avoiding the requirement of an N×N port crossbar switch to connect nodes is by implementing multiple levels of crossbar switches connected hierarchically. A constant bisection bandwidth (CBB) network topology, also known as "fat tree", is one example of a network topology that implements multiple levels of crossbar switches connected hierarchically and also reduces the number of switches required to connect N nodes. In one example, the CBB network topology may implement multiple layers of crossbar switches to connect nodes within a cluster system by effectively dividing the group of nodes into two equal subgroups, with each node connected to one switch in a first layer, and the first layer of switches interconnected through a second layer of switches, such that through the second layer of switches there is a shared link between any pair of nodes not sharing a same first layer crossbar switch.

While a CBB network topology reduces the number of switches required to connect any pair of nodes, sharing links between multiple nodes introduces the possibility of contentions that may occur when multiple requests to send from multiple nodes simultaneously arrive at a send channel for a switch for a shared link. Managing contentions increases data latency at crossbar switches. Within a parallel computing environment, the effects of increased data latency from contentions and inefficient use of available bandwidth by crossbar switches may increase if a parallel application broadcasts a large amount of data to all the nodes using a pipelined approach to break the data into chunks.

BRIEF SUMMARY

In a parallel computing environment, within a cluster of nodes interconnected by multiple crossbar switches arranged hierarchically with nodes sharing links, such as a CBB network topology, when managing a pipelined broadcast requested by a parallel application there is a need for a method, system, and program for efficient use of the underlying cluster of interconnected nodes by optimizing use of all available shared bandwidth while avoiding contention latency.

In one embodiment, a method, system, and program product are provided for contention free pipelined broadcasting through an interconnection network implementing a CBB network topology. In an interconnection network, multiple nodes are connected to one of a first layer of switches. The first layer of switches are connected to one another through a second layer of switches, wherein each of the nodes is connected through one of multiple shared links connecting the first layer switches and the second layer of switches. A pipelined broadcast manager schedules a hierarchical pipelined broadcast through at least one switch of the first layer switches comprising a multiple non-root nodes by selecting two nodes of multiple non-root nodes connected to the at least one switch and scheduling each of multiple broadcast steps for the pipelined broadcast with at least one of an inter-switch broadcast phase and an intra-switch broadcast phase. The inter-switch broadcast phase is scheduled with a first node of the two nodes receiving a first data packet from another switch from among the first layer of switches and a second node of the two nodes sending a second data packet previously received from another switch to one other switch from among the first layer switches. The intra-switch broadcast phase is scheduled with the first node acting as a source for sending a previously received data packet to at least one other non-root node and the second node acting as a sink for receiving the previously received data packet, wherein each of the non-root nodes sends and receives the previously received data packet once throughout the broadcast steps and the sink receives the previously received data packet last. In scheduling the hierarchical pipelined broadcast, the first node and the second node alternate roles each broadcast step.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 6 is a high level logic flowchart depicting a process and program for handling an MPI_BCAST operation within an interconnection switch implementing a CBB network topology;

FIG. 7 is a high level logic flowchart illustrating a process and program for scheduling a pipelined broadcast in each level one switch with nodes receiving the pipelined broadcast within an interconnection network implementing a CBB network topology.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art that the present invention may execute in a variety of systems, including a variety of computer systems and electronic devices operating any number of different types of operating systems.

Figure 1:
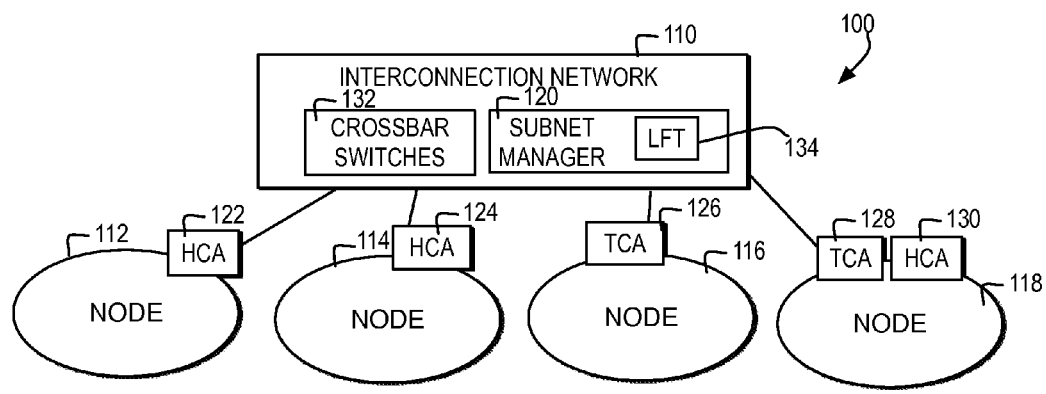
FIG. 1 is a block diagram illustrating one example of a high performance parallel computing system using an interconnection network implementing a constant bisection bandwidth (CBB) network topology.

With reference now to the Figures, and in particular with reference to FIG. 1, a block diagram illustrates one example of a high performance parallel computing system using an interconnection network implementing a constant bisection bandwidth (CBB) network topology. In the example, a parallel computing environment 100 includes an interconnection network 110 for connecting multiple nodes, illustrated as nodes 112, 114, 116, and 118.

Each of nodes 112, 114, 116, and 118 may include multiple types of computing nodes including, but not limited to, one or more of a processing node, an input/output (I/O) node, a singe processor system, a multiple processor system, a cluster system, a grid environment, and other systems including a network interface for connecting to interconnection network 110. Those of ordinary skill in the art will appreciate that while FIG. 1 illustrates nodes 112, 114, 116, and 118, parallel computing environment 100 may include any number of nodes implemented in one or more network protocol architectures.

In the example depicted, each of nodes 112, 114, 116, and 118 may include an adapter as part of the network interface for connecting to interconnection network 110. It will be understood that multiple types of adapters may be implemented by each of nodes 112, 114, 116, and 118, where each adapter may communicate with another adapter, a switch, or other component within interconnection network 110.

In the example depicted, nodes 112, 114, and 118 each implement a host channel adapter (HCA), illustrated as HCA 122, HCA 124, and HCA 130 to connect to the switching infrastructure of interconnection network 110. In one example, an HCA may be a card installed in an expansion slot or integrated into a host node's system board for connecting a processing node to interconnection network 110.

In addition, in the example depicted, nodes 116 and 118 each implement a target channel adapter (TCA), illustrated as TCA 126 and TCA 128, to connect to the switching infrastructure of interconnection network 110. In one example, a TCA may connect an I/O node, such as an external storage unit or I/O interface, to interconnection network 110.

Interconnection network 110 may include one or more types of network elements, switching elements, nodes, clusters, adapters, and other elements for communicatively connecting with nodes 112, 114, 116, and 118. In addition, interconnection network 110 may implement one or more types of underlying network architectures and services. For example, interconnection network 110 may include, but is not limited to, the Internet, a wide area networks (WANs), a local area networks (LANs), an Ethernet, a token ring, and a network service providers. Further, interconnection network 110 may transport data between nodes using one or more types of communication protocols. In one example, interconnection network 110 implements protocols for transferring data within a packet-switching network, such as using the transmission control protocol/internet protocol (TCP/IP), however, interconnection network 110 may include multiple gateways, routers, and other hardware, software and other elements to enable integration of networks using additional or alternate protocols and additional or alternate layers of protocols.

As illustrated, interconnection network 120 includes a subnet manager 120 for establishing the routing between nodes 112, 114, 116, and 118 and maintaining a table, message, or other data structure with routing instructions for routing packets between nodes via interconnection network 110. One or more instances and software layers of subnet manager 120 may be implemented within a single element or software layer within interconnection network 110 or distributed among multiple elements and software layers within interconnection network 110 and within nodes 112, 114, 116, and 118.

In one example, interconnection network 110 may implement a hierarchy of crossbar switches 132 for connecting nodes where multiple nodes share links between crossbar switches, such as the hierarchy of switches implemented in a CBB network topology. In the example, at initialization, subnet manager 120 determines a route for each of nodes 112, 114, 116, and 118 at each crossbar switch level and sets up a routing table, such as a Linear Forwarding Table (LFT) 134, for specifying a static, single path between each node and switch. In one example, the crossbar switches implemented within interconnection network 110 may include InfiniBand switches (InfiniBand is a registered trademark of InfiniBand Trade Association) implemented within an InfiniBand architecture. In one example, an InfiniBand architecture may represent a channel-based architecture which may include capabilities such as zero-copy data transfers using remote direct memory access (RDMA) and congestion-management. In addition, an InfiniBand architecture may implement a multi-layer architecture to transfer data from one node to another node. Each of nodes 112, 114, 116, and 118 may include software layers, drivers, and other components for sending and receiving data packets within the Infiniband architecture and in particular, for optimizing use of all available shared bandwidth within interconnection network 110, per the static, single path routing set in LFT 134, while avoiding contention latency.

Although not depicted, interconnection network 110 may implement high-speed, bi-directional interconnects between devices and between each of nodes 112, 114, 116, and 118. Each bi-directional link may contain one or more dedicated send and receive channels. One skilled in the art will appreciate that additional or alternate types of link hardware may be implemented within parallel computing environment 100.

Figure 2:
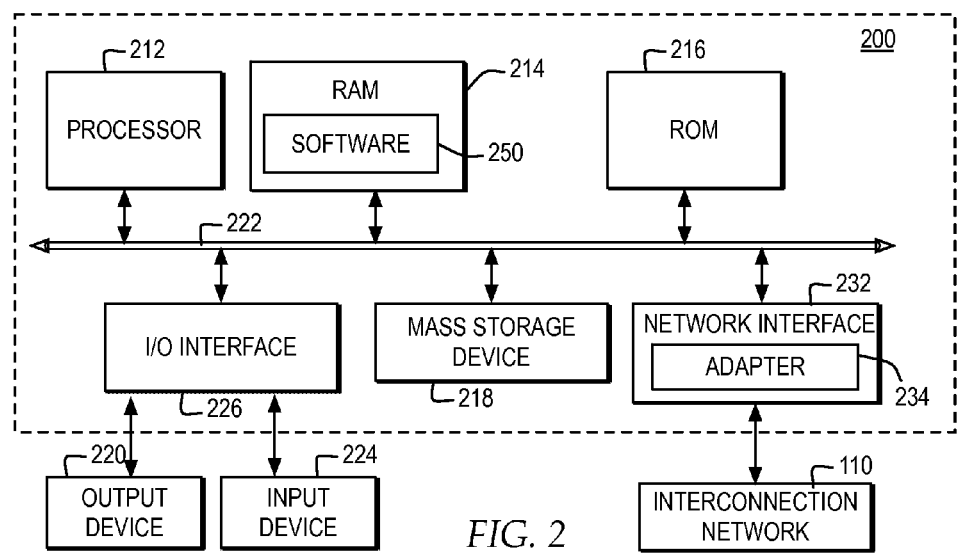
FIG. 2 is a block diagram depicting one example of a computer system in which the present invention may be implemented.

Referring now to FIG. 2, a block diagram illustrates one example of a computer system in which the present invention may be implemented. The present invention may be performed in a variety of systems and combinations of systems, made up of functional components, such as the functional components described with reference to computer system 200 and may be communicatively connected to a network, such interconnection network 110.

Computer system 200 includes a bus 222 or other communication device for communicating information within computer system 200, and at least one processing device, such as processor 212, coupled to bus 222 for processing information. Bus 222 preferably includes low-latency and higher latency paths that are connected by bridges and adapters and controlled within computer system 200 by multiple bus controllers. When implemented as a server or compute node, computer system 200 may include multiple processors designed to improve network servicing power. Where multiple processors share bus 222, additional controllers (not depicted) for managing bus access and locks may be implemented.

Processor 212 may be at least one general-purpose processor such as IBM's PowerPC (PowerPC is a registered trademark of International Business Machines Corporation) processor that, during normal operation, processes data under the control of software 250, which may include at least one of application software, an operating system, middleware, and other code and computer executable programs accessible from a dynamic storage device such as random access memory (RAM) 214, a static storage device such as Read Only Memory (ROM) 216, a data storage device, such as mass storage device 218, or other data storage medium. Software 250 may include, but is not limited to, applications, protocols, interfaces, and processes for controlling one or more systems within a network including, but not limited to, an adapter, a switch, a cluster system, and a grid environment.

Figure 8:
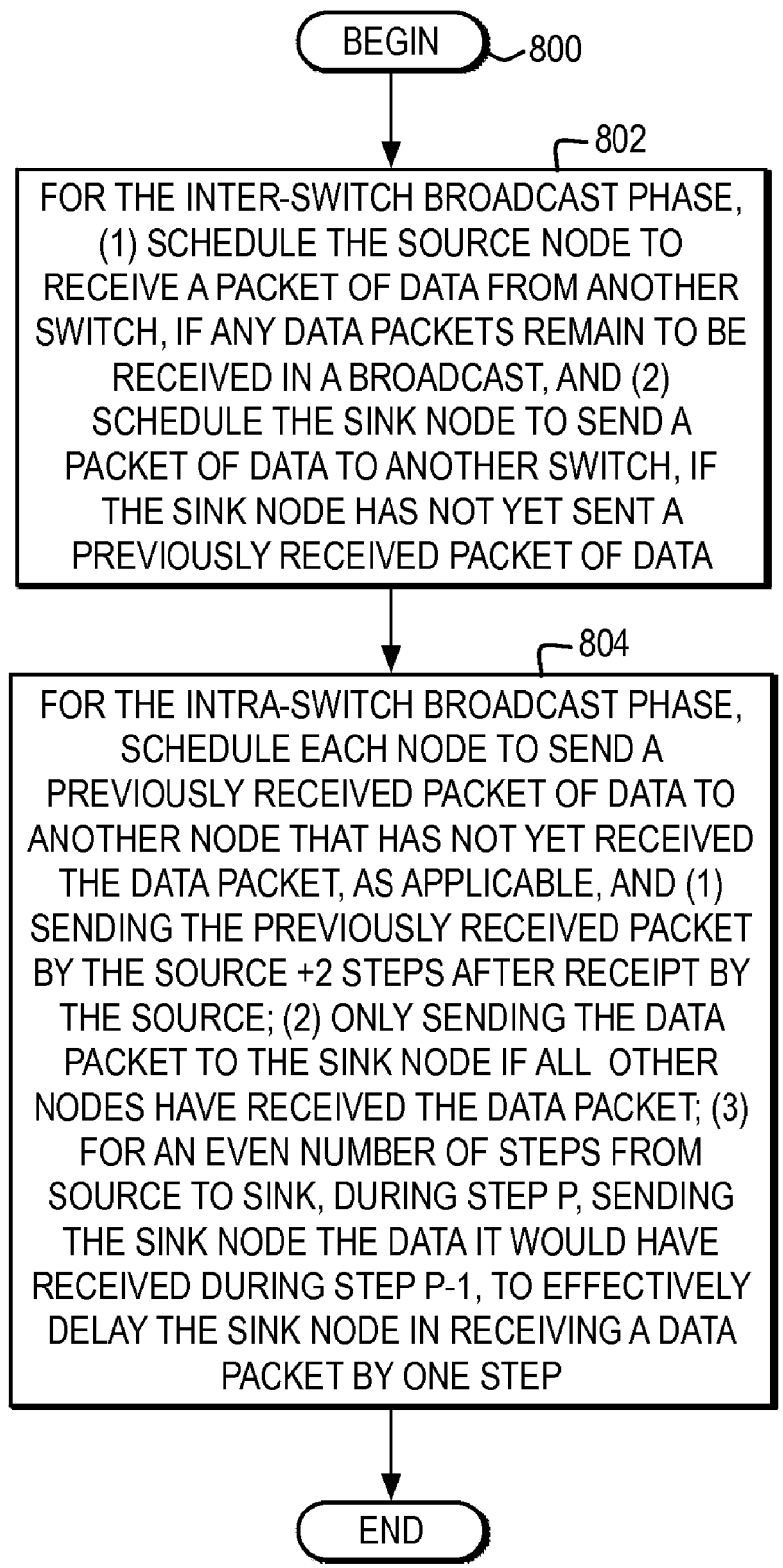
FIG. 8 is a high level logic flowchart illustrating a process and program for scheduling each broadcast step with inter-switch pipelined broadcast and intra-switch pipelined broadcast phases for non-root nodes.

In one embodiment, the operations performed by processor 212 may control the operations of flowchart of FIGS. 6-8 and other operations described herein. Operations performed by processor 312 may be requested by software 250 or other code or the steps of the present invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 218, a random access memory (RAM), such as RAM 214, a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 200, partly on the user's computer, as a stand-alone software package, partly on the user's computer and partly on a remote computer or entirely on the remote computer or server. In the latter scenario, the remote computer may be connected to the user's computer through any type of network, such as interconnection network 110, through a communication interface, such as network interface 232, over a network link that may be connected, for example, to interconnection network 110.

In the example, network interface 232 includes an adapter 234 for connecting computer system 200 to interconnection network 110 through a link. Although not depicted, network interface 232 may include additional software, such as device drivers, additional hardware and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 232, the network link to interconnection network 110, and interconnection network 110 may use electrical, electromagnetic, or optical signals that carry digital data streams. The signals through the various networks and the signals on interconnection network 110, the network link to interconnection network 110, and network interface 232 which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, an image scanning system, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
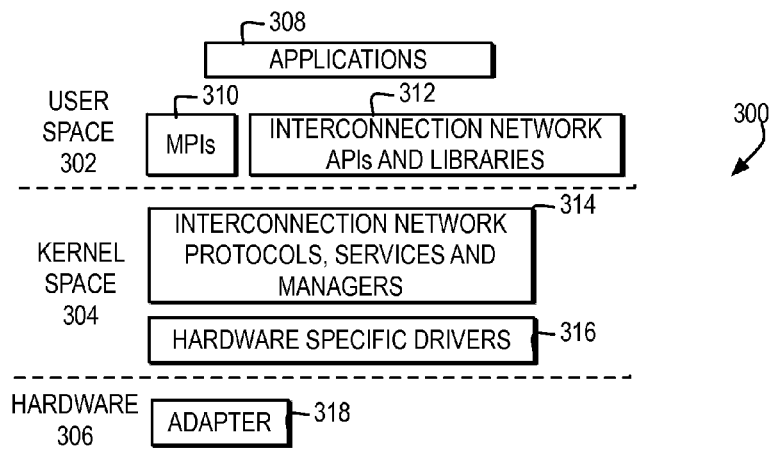
FIG. 3 is a block diagram illustrating one example of software layers within a parallel computing system implementing an interconnection network.

With reference now to FIG. 3, a block diagram illustrates one example of software layers within a parallel computing system implementing an interconnection network. As illustrated, software architecture layers 300 include a user space layer 302 including applications 308, MPI 310 and interconnection network APIs and libraries 312, a kernel space layer 304 including interconnection network protocols, services, and managers 314 and hardware specific drivers 316, and a hardware layer 306 including at least one adapter 318. One of ordinary skill in the art will appreciate that software architecture layers 300 may include additional or alternate layers and that each of user space layer 302, kernel space layer 304 and hardware layer 306 may include additional or alternate components.

In one embodiment, MPI 310 is the message passing interface library of calls used by applications 308 in parallel computing environment 100 for implementing parallel functions within parallel computing environment. MPI 310 is based on the MPI standard interface for providing point-to-point and collective primitives that can be called by application software. In particular, within parallel computing environment 100 multiple functions may execute among multiple nodes simultaneously and MPI 310 may facilitate the communication and synchronization of multiple functions across the entire parallel computing environment.

Interconnection network APIs and libraries 312 may include multiple types of application level and user APIs and one or more libraries specified for application level interactions with interconnection network 110 and user interaction with interconnection network 110. In one example, interconnection network APIs and libraries 312 may include management datagrams (MAD) APIs which provide an interface for MAD services within network protocols, services and managers 314 to communicate as part of or with subnet manager 120 for supporting the scheduling of data routing through the static, single path routes set in LFT 134.

Interconnection network protocols, services, and managers 314 includes services, mid-level modules, upper layer protocols and managers for scheduling and routing data transfers between applications as specified by MPI operations. In one example, interconnection network protocols, services, and managers 314 work together within one or more protocol layers including, but not limited to an upper layer protocol that receives messages triggered by MPI operations called by applications 308 within user space layer 302, a transport layer that splits messages into data payloads and encapsulates each data payload and an identifier for a destination node into one or more packets, a network layer that selects a route to the destination node based on the LFT 134, and a data link layer that attaches a local identifier (LID) to the packet. A hardware specific driver 316 may transform the packet for placement by hardware layer 306 onto the link to interconnection network 110.

In one embodiment of the invention, MPI 310 calls interconnection network APIs and libraries 312 and interconnection network protocols, services, and managers 314 for facilitating efficient, contention free, pipelined broadcasting within interconnection network 110, which implements a CBB network topology. In particular, MPI 310 defines the MPI_BCAST collective communication interface. Parallel applications may implement the MPI_BCAST collective communication interface of MPI for requesting pipelined, parallel application broadcasting. In an MPI_BCAST operation, data is passed from a process on one node ranked as the "root" to all the processes on a selection of other, non-root nodes. The MPI communicator designates the processes included in the selection of other, non-root nodes.

To optimize use of the MPI_BCAST command for a pipelined broadcast, a pipelining method may be implemented for the actual scheduling of the pipelined broadcast. As described herein, in one example, calling a routine PIPELINED_BCAST, supported within interconnection network APIs and libraries 312 or interconnection network protocols, services, and managers 314, triggers routines for controlling the scheduling and routing of the pipelined broadcast of data specified by the MPI_BCAST operation. To optimize a unicast based, pipelined, parallel application broadcast within an interconnection network implementing a CBB network topology using static, single path routing, PIPELINED_BCAST triggers scheduling pipeline steps to avoid link contentions and for efficient use of available bandwidth. One of ordinary skill in the art will appreciate that a pipelined method optimized for a fully-connected network topology, where a fully-connected network topology provides a dedicated link between any pair of nodes and no issue of link contentions, may not optimize pipeline routing in a CBB network topology where links are shared between nodes and contentions need to be avoided. It is important to note that the routine name PIPELINED_BCAST is used herein as one example of a command name called for implementing an optimized pipelined broadcast in an interconnection switch implementing a CBB network topology.

In one embodiment of the invention, calling the PIPELINED_BCAST routine triggers scheduling a pipelined broadcast such that every node only sends and receives each chunk of data one time. One of ordinary skill in the art will appreciate that PIPELINED_BCAST may integrate or operate with existing pipelining methods, such as a sequential pipelined broadcast method and process cooperation broadcast method, which share a common characteristic in that in scheduling the pipelined broadcast, every node only sends and receives each chunk of data one time, however, additionally, PIPELINED_BCAST is optimized to also reduce link contentions in a unicast CBB network topology implementing static, single path routing.

In addition, in one embodiment of the invention, the routine PIPELINED_BCAST implements a hierarchical pipelining method implementing an inter-switch pipelined broadcasting phase, during which packets are passed from one switch to another switch, with nodes connected to both switches, and an intra-switch pipelined broadcasting phase, during which packets are only passed among the nodes connected to a switch, as will be further described herein. In one example, when the interconnection network link between nodes supports one send channel and one receive channel, PIPELINED_BCAST selects two nodes per switch for the inter-switch pipelined broadcast and the two nodes act as the source and sink nodes during the intra-switch pipelined broadcast. When the interconnection network links between nodes supports additional send and receive channels, additional instances of PIPELINED_BCAST may be called for an MPI_BCAST operation and additional nodes per switch selected.

Figure 4:
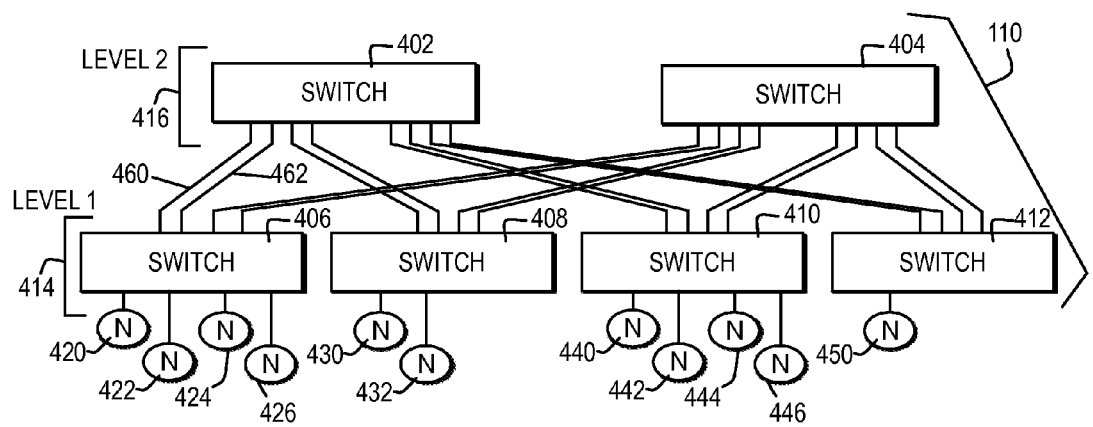
FIG. 4 is a block diagram depicting one example of a hierarchy of crossbar switches in an interconnection network implementing a CBB network topology.

With reference now to FIG. 4, a block diagram illustrates one example of a hierarchy of crossbar switches in an interconnection network implementing a CBB network topology. In the example illustrated, the CBB network topology uses multiple layers of crossbar switches to connect nodes within a cluster system by effectively dividing the group of nodes into two equal subgroups, with each node connected to one switch in a first layer, and the first layer of switches interconnected through another layer of switches, such that there is a shared link between any pair of nodes not sharing a same crossbar switch. One of ordinary skill in the art will appreciate that the CBB network topology may implement additional or alternate groupings of nodes and layers of crossbar switches.

As illustrated, interconnection network 110 may include a hierarchy of crossbar switches implemented in a CBB network topology. A first level of crossbar switches illustrated at reference numeral 414 include crossbar switches 406, 408, 410, and 412. Each of crossbar switches 406, 408, 410, and 412 provide a separate port for a particular node. In the example, nodes (N) 420, 422, 424, and 426 are connected to separate ports of switch 406, nodes (N) 430 and 432 are connected to separate ports of switch 408, nodes (N) 440, 442, 444, and 446 are connected to separate ports of switch 410, and nodes (N) 450 is connected to separate ports of switch 412. Those of ordinary skill in the art will appreciate that the first level of cross bar switches illustrated at reference numeral 414 may include any number of crossbar switches and each switch may include any number of ports.

In addition, in the example, within interconnection network 110, a second level of crossbar switches illustrated at reference numeral 416 include crossbar switches 402 and 404. Each of crossbar switches 402 and 404 provide at least one link to each of crossbar switches 406, 408, 410, and 412 in the first level of crossbar switches illustrated at reference numeral 416. In particular, as illustrated, each of crossbar switches 402 and 404 implement two ports to provide two links to each of crossbar switches 406, 408, 410, and 412. Those of ordinary skill in the art will appreciate that the second level of cross bar switches illustrated at reference numeral 416 may include any number of crossbar switches and each switch may include any number of ports.

Subnet manager 120 may be distributed within one or more of switches 402, 404, 406, 408, 410, and 412 and manage LFT 134, where LFT 134 specifies a static, single path route between each of the nodes and each of the switches. In one example, during initialization, subnet manager 120 may set up LFT 134 for inter-switch routing with a single path route set for each of node to nodes connected to other switches through switches in the first level of crossbar switches illustrated at reference numeral 414 and through switches in the second level of crossbar switches illustrated at reference numeral 416 and may also set up LFT 134 for intra-switch routing with a single path route for each of the nodes to nodes in the same switch through the switch in the first level as illustrated at reference numeral 414.

As described herein, hardware unicast refers to each network packet being routed to reach one destination when data is broadcast within parallel computing environment 100, in contrast to hardware multicast wherein each network packet is routed to reach a group of destinations. In addition, for a large data broadcast, to further improve the efficiency of use of available bandwidth available to all the nodes, a pipelined method may be implemented. In a pipelined approach the message or data to be broadcast is split into multiple chunks and chunks are broadcast individually.

As previously noted, applications 408 may call MPIs 310, including the use of the MPI_BCAST command. For a data message large enough to be broken into multiple data packets, MPI_BCAST triggers a pipelining method for the actual scheduling of the pipelined broadcast of the data message. As described herein, in one example, calling one or more PIPELINED_BCAST routines triggers the scheduling and routing of the pipelined broadcast of a data message to be broadcast in packets.

In particular, for a unicast based, pipelined, parallel application broadcast within a CBB network topology implementing static, single path routing, an optimized pipelining method schedules pipeline steps to avoid link contentions and to efficiently use available bandwidth. In one example of the potential for link contentions within a CBB network topology, LFT 134 may specify a same link 460 as the static, single path route for both node 420 and node 422 from switch 406 in the first level to switch 402 in the second level. If both node 420 and node 422 attempt to send packets at the same time which are routed through a single send channel of link 460, a link contention will occur.

As previously described with reference to FIG. 3, to decrease contentions and optimize bandwidth use in a pipelining process implementing static, single path routing in an interconnection network implementing a CBB network topology, PIPELINED_BCAST implements a hierarchical pipelining method implementing an inter-switch pipelined broadcasting phase, during which packets are passed from one switch to another switch, with nodes connected to both switches, and an intra-switch pipelined broadcasting phase, during which packets are only passed among the nodes connected to a switch. The inter-switch PIPELINED_BCAST and intra-switch PIPELINED_BCAST phases may be implemented by a same routine or different routines. In addition, each step of a pipelined broadcast may include both inter-switch PIPELINED_BCAST and intra-switch PIPELINED_BCAST phases, only an inter-switch PIPELINED_BCAST phase, or only an intra-switch PIPELINED_BCAST phase.

In one embodiment, for PIPELINED_BCAST, two nodes per switch are selected for the inter-switch pipelined broadcast and the two nodes act as the source and sink nodes during the intra-switch pipelined broadcast. For example, node 420 and node 422 may be selected from switch 406 for the inter-switch pipelined broadcast to switch 402 and to act as the source and sink nodes during the intra-switch pipelined broadcast to nodes 424 and 426 through switch 406.

For the hierarchical pipelined broadcast method described, in general, the two selected nodes alternate roles for each scheduled pipelined step. In a first step, a first of the two nodes receives a chunk of data from the switch according to the inter-switch schedule and acts as the source of the intra-switch pipelined broadcast to send a previously received chunk to another node connected to the same switch according to the intra-switch pipelined broadcast schedule. In the first step, a second of the two nodes acts as the sink of the intra-switch pipelined broadcast, sends a previously received chunk to another switch following the inter-switch pipelined broadcast schedule, and receives a chunk from some other node connected to the same switch according to the intra-switch pipelined broadcast schedule. In the next step, the second of the two nodes performs the role previously performed by the first of the two nodes and the first of the two nodes performs the role previously performed by the second of the two nodes. The two nodes continue iteratively alternating roles in each step until all the chunks of the pipelined broadcast are received at all the nodes included in a communicator group specified in the MPI_BCAST command.

In one example of PIPELINED_BCAST, switch 406 is not the root switch to the node from which data originates and it takes an odd number of steps for a chunk of data to be transferred from the source to the sink during the intra-switch pipelined broadcast. In a first step, step 0, node 420 may receive a chunk of data passed to switch 406 from switch 408 according to the inter-switch schedule and act as the source node for switch 406 to send a previously received chunk of data, if any, to node 424, for example, according to the intra-switch broadcast schedule. In addition, in the first step, node 422 acts as the sink of the intra-switch pipelined broadcast, sends a previously received chunk, if any, from switch 406 to switch 402 according to the inter-switch schedule, and receives a chunk of data from node 426, for example, if node 426 has previously received a chunk of data, according to the intra-switch pipelined broadcast schedule. In a second step, step 1, node 422 may receive a chunk of data passed to switch 406 from switch 402 according to the inter-switch schedule and act as the source node for switch 406 to send a previously received chunk of data, if any, to node 424, for example, according to the intra-switch broadcast schedule. In addition, in the second step, node 420 acts as the sink of the intra-switch pipelined broadcast, sends a previously received chunk, if any, from switch 406 to switch 402 according to the inter-switch schedule, and receives a chunk of data from node 426, for example, if node 426 has previously received a chunk of data, according to the intra-switch pipelined broadcast schedule. In continuing steps, nodes 420 and 422 continue to switch roles.

In the example described implementing PIPELINED_BCAST for a non-root switch, although both node 420 and node 422 may be routed through the same channel of link 460 between switch 406 and switch 402, and although two nodes per switch participate in the inter-switch pipelined broadcast, there is no link contention on link 460 since for each step, only one of the nodes may be receiving data from another switch and the other one of the nodes may be sending data to the other switch. In addition for PIPELINED_BCAST, by selecting two nodes per switch to participate in the inter-switch pipelined broadcast and act as source and sink in the intra-switch pipelined, for each pipelined step the intra-switch and inter-switch pipelined broadcast steps overlap as much as possible, optimizing use of available bandwidth of the system while also avoiding link contentions. In particular, as described, for each pipelined step, the inter-switch pipelined broadcast is not delayed by the intra-switch pipelined broadcast and the intra-switch pipelined broadcast does not have to wait until the completion of the inter-switch pipelined broadcast.

In another example of PIPELINED_BCAST, switch 406 is not the root switch to the node from which data originates, but it takes an even number of steps for a chunk of data to be transferred from the source to the sink during the intra-switch pipelined broadcast, in contrast to the previous example requiring an odd number of steps for a chunk of data to be transferred from the source to the sink during the intra-switch pipelined broadcast. In this example, the modification from the general example provided is that the node acting as the sink, such as node 420, during a step p, receives the chunk that was supposed to go to the sink during step p-1. In this example, if no chunk of data should reach the sink yet during step p-1, node 420 does not receive anything. By each of node 420 and node 422, when each is the sink, receiving the data that was supposed to go to the sink during a previous step, each sink is effectively delayed in receiving each chunk of data by one step, and each sink is guaranteed to be the last node in the switch to receive every chunk of data.

In another example of PIPELINED_BCAST, there may only be one node attached to a switch, as illustrated by switch 412, which only has node 450 attached. In this example of only one node attached to a switch, whether the switch is a root switch or a non-root switch, only inter-switch PIPELINED_BCAST phrases are called for switch 412.

In yet another example of PIPELINED_BCAST, a switch is the root switch, such as if node 430 is the node originating a pipelined broadcast and switch 408 is the root switch, and there are only two nodes attached to the root switch, illustrated as nodes 430 and 432. In this example of a root switch with only two nodes attached, node 430, as the root node, sends the chunks of data one by one to node 432 during each step. After the first step, step 0, node 432 may act as if it is the root node of the pipelined broadcast and as if it is the only node connected to switch 408, which is the root switch.

In another example of PIPELINED_BCAST, a switch is the root switch, such as if node 440 is the node originating a pipelined broadcast and switch 410 is the root switch, and there are more than two nodes attached to the root switch, illustrated as nodes 440, 442, 444, and 446. In this example of a root switch with more than two nodes attached, the PIPELINED_BCAST is scheduled as if there are two switches, with node 440, the root node, effectively attached to one switch only triggering inter-switch PIPELINED_BCAST phases, and nodes 442, 444, and 446 effectively attached to another switch triggering both inter-switch and intra-switch PIPELINED_BCAST phases.

Figure 5:
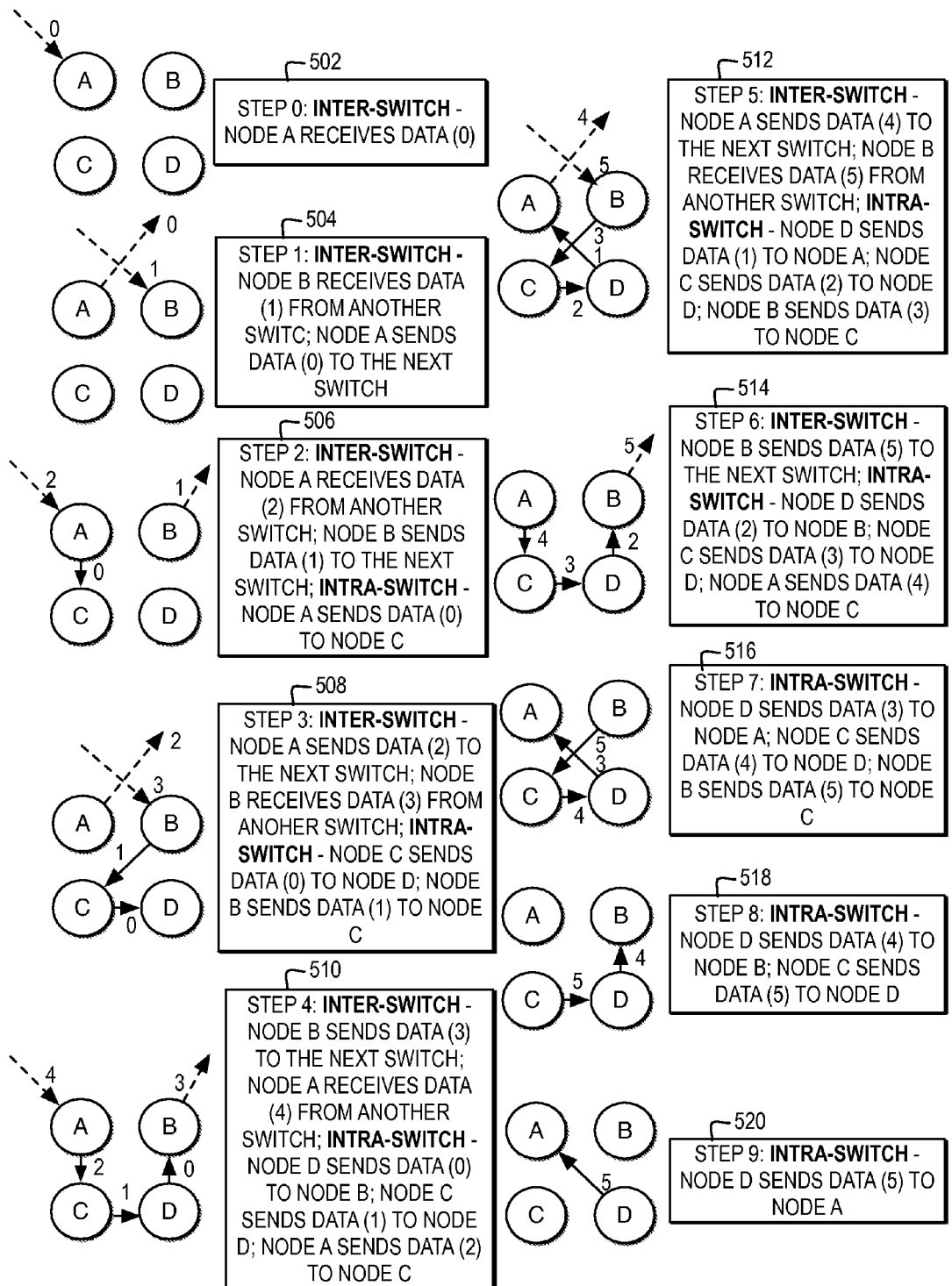
FIG. 5 is a block diagram illustrating an example of a pipelined parallel application broadcast within a CBB network topology implementing static, single path routing at a switch with two or more nodes connected to it, that is not the root switch, that takes an odd number of steps for a chunk of data to be transferred from the source to the sink during intra-switch broadcast.

Referring now to FIG. 5, a block diagram illustrates an example of a pipelined parallel application broadcast within a CBB network topology implementing static, single path routing at a switch with two or more nodes connected to it, that is not the root switch, that takes an odd number of steps for a chunk of data to be transferred from the source to the sink during intra-switch broadcast.

In the example, nodes A and B are selected as the two nodes for the alternating source and sink connected to a first switch, that is not the root switch. Nodes C and D are also connected to the first switch.

Starting at step 0 illustrated at reference numeral 502, nodes A and B are selected as the two nodes connected to a switch that is not the root switch. In the example, node A is set as the source and node B as the sink during the first step. In step 0, during the inter-switch phase, node A receives the first data packet (0) from another switch.

Next, at step 1 illustrated at reference numeral 504, node B acts as the source and node A acts as the sink. In step 1, during the inter-switch phase, node B receives data packet (1) from another switch and node A sends data packet (0) to a next switch.

At step 2 illustrated at reference numeral 506, node A acts as the source and node B acts as the sink. In step 2, during the inter-switch phase, node A receives data packet (2) from another switch and node B sends data packet (1) to the next switch. In step 2, during an intra-switch phase, node A sends data packet (0) to node C through the first switch, as each data packet is passed to each node connected to the first switch only one time during the pipelined broadcast.

At step 3 illustrated at reference numeral 508, node A acts as the sink and node B acts as the source. In step 3, during the inter-switch phase, node A sends data packet (2) to the next switch and node B receives data packet (3) from another switch. In step 3, during the intra-switch phase, node C sends data packet (0) to node D through the first switch and node B sends data packet (1) to node C through the first switch, as each node connected to the first switch, as each data packet is passed to each node connected to the first switch only one time during the pipelined broadcast.

At step 4 illustrated at reference numeral 510, node A acts as the source and node B acts as the sink. In step 4, during the inter-switch phase, node A receives data packet (4) from another switch and node B sends data packet (3) to a next switch. In step 4, during the intra-switch phase, node D sends data packet (0) to node B, node C sends data packet (1) to node D, and node A sends data packet (2) to node C, as each data packet is passed to each node connected to the first switch only one time during the pipelined broadcast, and where sink node B is the last node to receive data packet (0).

At step 5 illustrated at reference numeral 512, node A acts as the sink, node B acts as the source and the last chunk of data arrives. In step 5, as illustrated, during the inter-switch phase, node A sends data packet (4) to a next switch and node B receives data packet (5) from another switch. In step 5, during the intra-switch phase, node D sends data packet (1) to node A, node C sends data packet (2) to node D, and node B sends data packet (3) to node C, as each data packet is passed to each node connected to the first switch only one time during the pipelined broadcast, and where sink node A is the last node to receive data packet (1).

At step 6 illustrated at reference numeral 514, node A acts as the source and node B acts as the sink. In step 6, during the inter-switch phase, node A receives data packet (6) from another switch and node B sends data packet (5) to a next switch, the last step that any node of the switch is involved in inter-switch broadcast. In step 6, during the intra-switch phase, node D sends data packet (2) to node B, node C sends data packet (3) to node D, and node A sends data packet (4) to node C, as each data packet is passed to each node connected to the first switch only one time during the pipelined broadcast, and where sink node B is the last node to receive data packet (2).

At step 7 illustrated at reference numeral 516, node A acts as the sink and node B acts as the source. In step 7, during the intra-switch phase, node D sends data packet (3) to node A, node C sends data packet (4) to node D, and node B sends data packet (5) to node C, as each data packet is passed to each node connected to the first switch only one time during the pipelined broadcast, and where sink node A is the last node to receive data packet (3).

At step 8 illustrated at reference numeral 518, node A acts as the source and node B acts as the sink. In step 8, during the intra-switch phase, node D sends data packet (4) to node B and node C sends data packet (5) to node D, as each data packet is passed to each node connected to the first switch only one time during the pipelined broadcast, and where sink node B is the last node to receive data packet (4).

At step 9, illustrated at reference numeral 520, node A in this final step acts as the sink and node B as the source. In step 9, during the intra-switch phase, node D sends data packet (5) to node A, as each data packet is passed to each node of the group only one time during the pipelined broadcast, and where sink node A is the last node to receive data packet (5), which is also the last data packet.

Although not depicted, there may be a case where the intra-switch broadcast finishes and node A or node B may not have received all the data from the other node. In this case, nodes A and B may directly exchange data in additional steps.

With reference now to FIG. 6, a high level logic flowchart depicts a process and program for handling an MPI_BCAST operation within an interconnection switch implementing a CBB network topology. In the example, the process starts at block 600 and thereafter proceeds to block 602. Block 602 illustrates a determination whether an MPI_BCAST command or other broadcast operative is triggered for a pipelined broadcast. If an MPI_BCAST command or other broadcast operative is triggered for a pipelined broadcast, then the process passes to block 604. Block 604 illustrates triggering a PIPELINED_BCAST operation for scheduling unicast pipelined broadcasting of data packets according to the static, single path routing set for each node, within an interconnection network implementing a CBB network topology, and the process ends.

Referring now to FIG. 7, a high level logic flowchart illustrates a process and program for scheduling a pipelined broadcast in each level one switch with nodes receiving the pipelined broadcast within an interconnection network implementing a CBB network topology. In the example, the process starts at block 700 and thereafter proceeds to block 702. In one example, the process at block 700 starts when a PIPELINED_BCAST operation is triggered. Block 702 illustrates a determination whether or not a switch is a switch with only one node attached. If the switch is a switch with only one node attached, then the process passes to block 704. Block 704 depicts scheduling inter-switch broadcasting only for the node connected to the switch, and the process ends. Returning to block 702, if the switch is not a switch with only one node attached, then the process passes to block 706.

Block 706 illustrates a determination whether the switch is a root switch with only two nodes attached. If the switch is not a root switch with only two nodes attached, then the process passes to block 712. If the switch is a root witch with only two nodes attached, then the process passes to block 708. Block 708 illustrates scheduling the root node to send the non-root node attached to the switch a packet during each step. Next, block 710 depicts scheduling an inter-switch broadcast only for the non-root node after the first step, or step 0, and the process passes to block 712.

Block 712 depicts a determination whether the switch is a root switch with more than two nodes attached. If the switch is a root switch with more than two nodes attached, then the process passes to block 718. Block 718 illustrates scheduling the root node for inter-switch broadcast only. Next, block 720 depicts selecting two nodes from the non-root nodes. Thereafter, block 722 illustrates for each broadcast step, as applicable along the non-root nodes connected to the switch, scheduling inter-switch broadcast phases for the two selected nodes and intra-switch broadcast phases with the two selected nodes alternating as source and sink, wherein each node sends and receives each data packet once, and the sink receives each data packet last, and the process ends.

Returning to block 712, if the switch is not a root switch with more than two nodes attached, the process passes to block 714. Block 714 illustrates a determination whether the switch is a non-root switch. If the switch is a non-root switch, then the process passes to block 720, and proceeds as previous described. If the switch is a non-root switch, then the process passes to block 716. Block 716 depicts scheduling pipelining for the current pipelining broadcast case triggered, and the process ends.

With reference now to FIG. 8, a high level logic flowchart illustrates a process and program for scheduling each broadcast step with inter-switch pipelined broadcast and intra-switch pipelined broadcast phases for non-root nodes. In the example, the process starts to block 800 and thereafter proceeds to block 802. Block 802 illustrates, for a broadcast step, for the inter-switch broadcast phase, as applicable for the step, (1) scheduling the source node to receive a packet of data from another switch, if any data packets remain to be received in a broadcast, and (2) scheduling the sink node to send a packet of data to another switch, if the sink node has not yet sent a previously received packet of data. Next, block 804 depicts, for the broadcast step, for the intra-switch broadcast phase, as applicable for the step, scheduling each node to send a previously received packet of data to another node connected to the switch that has not yet received the data packet following rules of (1) sending the previously received packet by the source +2 steps after receipt by the source, (2) only sending the data packet to the sink node if all other nodes connected to the switch have received the data packet, and (3) for an even number of steps from source to sink, during step p, sending the sink node the data it would have received during step p-1, to effectively delay the sink node in receiving the data packet by one step, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A parallel computing system, comprising:
   a plurality of nodes each of which comprises at least one processor and at least one adapter;
   an interconnection network comprising a first plurality of switches wherein each of the plurality of nodes is connected to one of the first plurality of switches and wherein each of the first plurality of switches is connected through a second plurality of switches, wherein each of the plurality of nodes is connected through a plurality of shared links connecting the first plurality of switches and the second plurality of switches;

a user space layer distributed in at least one of the plurality of nodes comprising a message passing interface (MPI) layer for receiving a message passing interface broadcast command from an application, wherein the message passing interface broadcast command triggers an MPI broadcast for passing a plurality of data packets from one of the plurality of nodes ranked as a root node to a selection of non-root nodes from among the plurality of nodes;

the MPI layer for triggering a pipelined broadcast manager to schedule a hierarchical pipelined broadcast for the MPI broadcast; and the pipelined broadcast manager for scheduling the hierarchical pipelined broadcast through at least one switch of the first plurality of switches from among a plurality of non-root nodes by selecting two nodes of the plurality of non-root nodes connected to the at least one switch and scheduling each of a plurality of broadcast steps for the hierarchical pipelined broadcast with at least one of an inter-switch broadcast phase with a first node of the two nodes receiving a first data packet from another switch from among the first plurality of switches and a second node of the two nodes sending a second data packet previously received from the another switch to one other switch from among the plurality of switches and an intra-switch broadcast phase with the first node acting as a source for sending a previously received data packet to at least one other non-root node and the second node acting as a sink for receiving the previously received data packet, wherein each of the non-root nodes sends and receives the previously received data packet once throughout the plurality of broadcast steps and the sink receives the previously received data packet last, wherein for each next step of the plurality of broadcast steps the first node and the second node alternate roles.

2. The parallel computing system according to claim 1 further comprising:
the interconnection network further comprising a subnet manager for setting a table comprising each separate single, static route set between each of the plurality of nodes through the plurality of shared links; and
the pipelined broadcast manager for scheduling each of the plurality of broadcast steps for the pipelined broadcast for routing according to the table.

3. The parallel computing system according to claim 1 further comprising:
the pipelined broadcast manager for scheduling the hierarchical pipelined broadcast for hardware unicast wherein each data packet of a plurality of data packets broadcast during the hierarchical pipelined broadcast is routed to reach one destination.

4. The parallel computing system according to claim 1 wherein the at least one adapter further comprises at least one of a host channel adapter for connecting a processing node to the interconnection network and a target channel adapter for connecting an input/output node to the interconnection network.

5. The parallel computing system according to claim 1, further comprising:
the pipelined broadcast manager, for the hierarchical pipelined broadcast through the at least one switch which is a non-root switch from among the first plurality of switches of a broadcast and which requires an even number of steps for a data packet to be transferred from the source to the sink during the intra-switch broadcast phase, for scheduling a delayed step in the sink receiving a particular packet, wherein during a broadcast step p from among the plurality of broadcast steps the sink receives the particular data packet that should have reached the sink node during a step p-1 from among the plurality of broadcast steps.

6. The parallel computing system according to claim 1, further comprising:
the pipelined broadcast manager, for the hierarchical pipelined broadcast through another switch of the first plurality of switches comprising only a single node attached to the another switch, for scheduling only the inter-switch broadcast phrase for each of the plurality of broadcast steps for the single node of the another switch.

7. The parallel computing system according to claim 1, further comprising:
the pipelined broadcast manager, for the hierarchical pipelined broadcast through a root switch from among the first plurality of switches comprising a selection of only two nodes attached from among the plurality of nodes, for scheduling an actual root node originating the hierarchical pipelined broadcast from among the selection of two nodes to send each separate data packet during a separate broadcast step from among the plurality of steps to the other non-root node from among the selection of two nodes and for scheduling the other non-root node for the inter-switch broadcast phases only and functioning as a root node.

8. The parallel computing system according to claim 1, further comprising:
the pipelined broadcast manager, for the hierarchical pipelined broadcast through a root switch from among the first plurality of switches comprising a selection of more than two nodes attached from among the plurality of nodes, for scheduling a root node originating the hierarchical pipelined broadcast from among the selection of more than two nodes for the inter-switch broadcast phase only during the plurality of broadcast steps as if the root node is connecting to one switch and scheduling the other non-root nodes from among the selection of more than two nodes as if the other non-root nodes are connected to another switch separate from the root node.

9. A method for pipelined broadcasting within an interconnection network, comprising:
connecting communicatively a plurality of nodes each of which comprises at least one adapter through an interconnection network comprising a first plurality of switches, wherein each of the plurality of nodes is connected to one of the first plurality of switches and wherein each of the first plurality of switches is connected through a second plurality of switches, wherein each of the plurality of nodes is connected through a plurality of shared links connecting the first plurality of switches and the second plurality of switches;
implementing a user space layer distributed in at least one of the plurality of nodes comprising a message passing interface (MPI) layer for receiving a message passing interface broadcast command from an application, wherein the message passing interface broadcast command triggers an MPI broadcast for passing a plurality of data packets from one of the plurality of nodes ranked as a root node to a selection of non-root nodes from among the plurality of nodes;
triggering, by the MPI layer, scheduling of a hierarchical pipelined broadcast for the MPI broadcast; and
scheduling, using a processor, the hierarchical pipelined broadcast through at least one switch of the first plurality of switches from among a plurality of non-root nodes by:
selecting, using the processor, two nodes of the plurality of non-root nodes connected to the at least one switch; and
scheduling, using the processor, each of a plurality of broadcast steps for the hierarchical pipelined broadcast with at least one of an inter-switch broadcast phase with a first node of the two nodes receiving a first data packet from another switch from among the first plurality of switches and a second node of the two nodes sending a second data packet previously received from the another switch to one other switch from among the plurality of switches and an intra-switch broadcast phase with the first node acting as a source for sending a previously received data packet to at least one other non-root node and the second node acting as a sink for receiving the previously received data packet, wherein each of the non-root nodes sends and receives the previously received data packet once throughout the plurality of broadcast steps and the sink receives the previously received data packet last, wherein for each next step of the plurality of broadcast steps the first node and the second node alternate roles.

10. The method according to claim 9 further comprising:
setting a table comprising each separate single, static route set between each of the plurality of nodes through the plurality of shared links by a subnet manager within the interconnection network; and
scheduling each of the plurality of broadcast steps for the pipelined broadcast for routing according to the table.

11. The method according to claim 9 further comprising:
scheduling the hierarchical pipelined broadcast for hardware unicast wherein each data packet of a plurality of data packets broadcast during the hierarchical pipelined broadcast is routed to reach one destination.

12. The method according to claim 9, wherein the at least one adapter further comprises at least one of a host channel adapter for connecting a processing node to the interconnection network and a target channel adapter for connecting an input/output node to the interconnection network.

13. The method according to claim 9, further comprising:
scheduling, for the hierarchical pipelined broadcast through the at least one switch which is a non-root switch from among the first plurality of switches of a broadcast and which requires an even number of steps for a data packet to be transferred from the source to the sink during the intra-switch broadcast phase, a delayed step in the sink receiving a particular packet, wherein during a broadcast step p from among the plurality of broadcast steps the sink receives the particular data packet that should have reached the sink node during a step p-1 from among the plurality of broadcast steps.

14. The method according to claim 9, further comprising:
scheduling, for the hierarchical pipelined broadcast through another switch of the first plurality of switches comprising only a single node attached to the another switch, only the inter-switch broadcast phrase for each of the plurality of broadcast steps for the single node of the another switch.

15. The method according to claim 9, further comprising:
scheduling, for the hierarchical pipelined broadcast through a root switch from among the first plurality of switches comprising a selection of only two nodes attached from among the plurality of nodes, an actual root node originating the hierarchical pipelined broadcast from among the selection of two nodes to send each separate data packet during a separate broadcast step from among the plurality of steps to the other non-root node from among the selection of two nodes and for scheduling the other non-root node for the inter-switch broadcast phases only and functioning as a root node.

16. The method according to claim 9, further comprising:
scheduling, for the hierarchical pipelined broadcast through a root switch from among the first plurality of switches comprising a selection of more than two nodes attached from among the plurality of nodes, a root node originating the hierarchical pipelined broadcast from among the selection of more than two nodes for the inter-switch broadcast phase only during the plurality of broadcast steps as if the root node is connecting to one switch and scheduling the other non-root nodes from among the selection of more than two nodes as if the other non-root nodes are connected to another switch separate from the root node.

17. A computer program product for pipelined broadcasting within an interconnection network, the computer program product comprising:
one or more computer-readable, tangible storage devices;
program instructions, stored on at least one of the one or more storage devices, to connect communicatively a plurality of nodes each of which comprises at least one adapter through an interconnection network comprising a first plurality of switches, wherein each of the plurality of nodes is connected to one of the first plurality of switches and wherein each of the first plurality of switches is connected through a second plurality of switches, wherein each of the plurality of nodes is connected through a plurality of shared links connecting the first plurality of switches and the second plurality of switches;
program instructions, stored on at least one of the one or more storage devices, to implement a user space layer distributed in at least one of the plurality of nodes comprising a message passing interface (MPI) layer for receiving a message passing interface broadcast command from an application, wherein the message passing interface broadcast command triggers an MPI broadcast for passing a plurality of data packets from one of the plurality of nodes ranked as a root node to a selection of non-root nodes from among the plurality of nodes;
program instructions, stored on at least one of the one or more storage devices, to trigger, by the MPI layer, scheduling of a hierarchical pipelined broadcast for the MPI broadcast; and
program instructions, stored on at least one of the one or more storage devices, to schedule the hierarchical pipelined broadcast through at least one switch of the first plurality of switches from among a plurality of non-root nodes by selecting two nodes of the plurality of non-root nodes connected to the at least one switch and scheduling each of a plurality of broadcast steps for the hierarchical pipelined broadcast with at least one of an inter-switch broadcast phase with a first node of the two nodes receiving a first data packet from another switch from among the first plurality of switches and a second node of the two nodes sending a second data packet previously received from the another switch to one other switch from among the plurality of switches and an intra-switch broadcast phase with the first node acting as a source for sending a previously received data packet to at least one other non-root node and the second node acting as a sink for receiving the previously received data packet, wherein each of the non-root nodes sends and receives the previously received data packet once throughout the plurality of broadcast steps and the sink receives the previously received data packet last, wherein for each next step of the plurality of broadcast steps the first node and the second node alternate roles.

* * * * *